Jan. 12, 1965  R. L. FULLMAN  3,164,896
PROCESS FOR CONTINUOUS MANUFACTURE OF TUBING
Filed Jan. 12, 1960  2 Sheets-Sheet 2
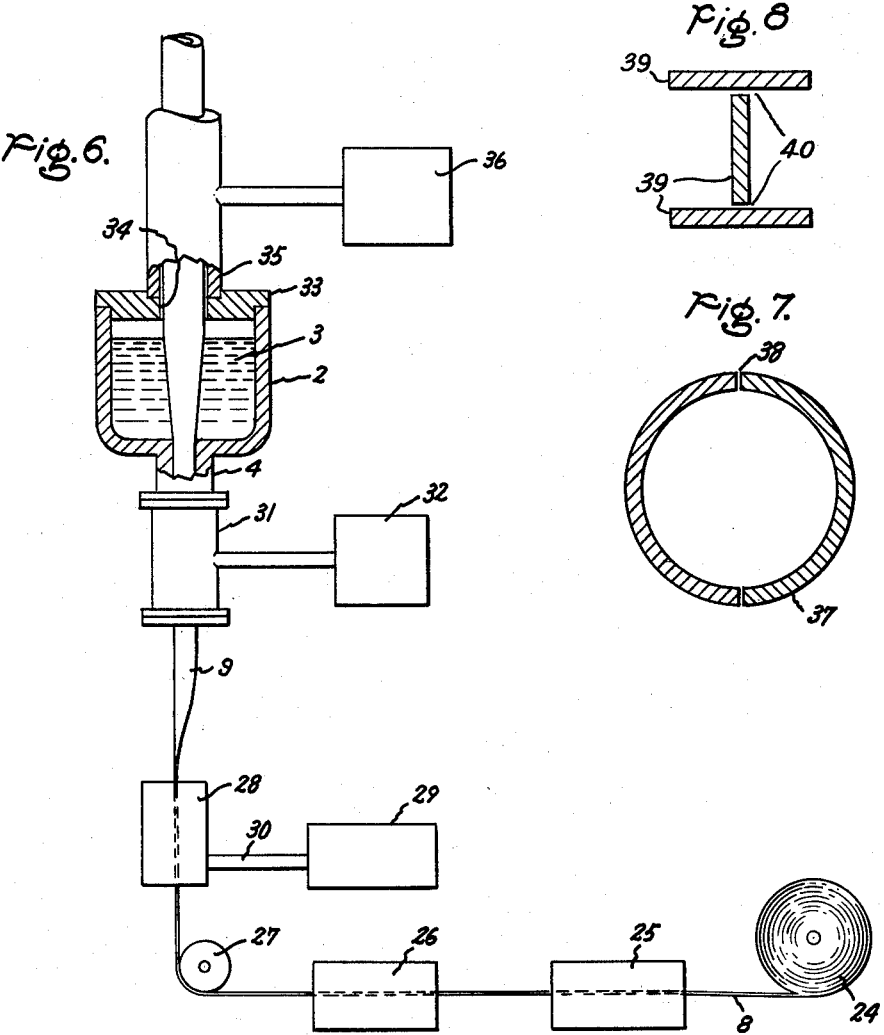
Inventor:
Robert L. Fullman,
by His Attorney.

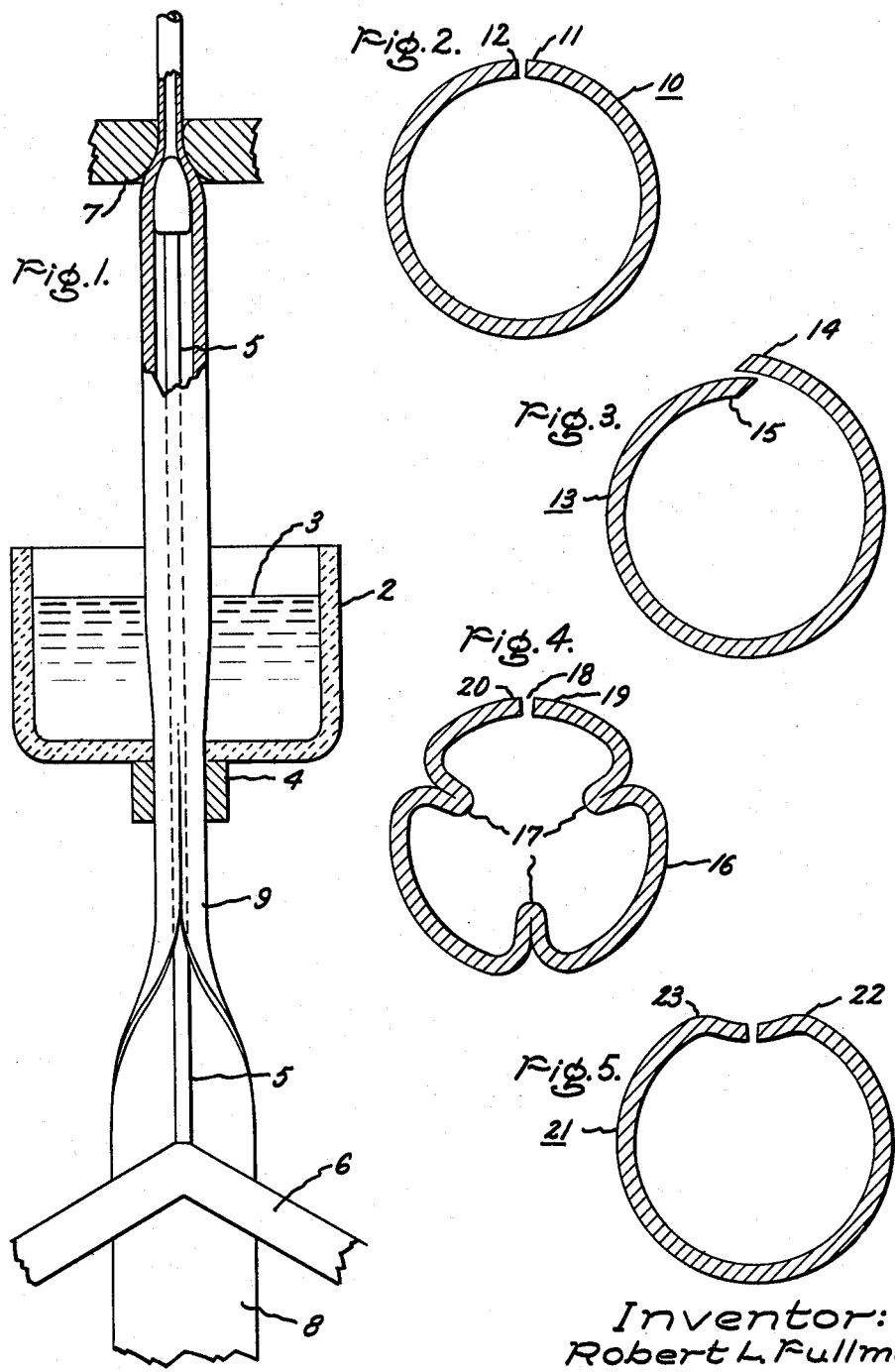

United States Patent Office 3,164,896
Patented Jan. 12, 1965

3,164,896
PROCESS FOR CONTINUOUS MANUFACTURE
OF TUBING
Robert L. Fullman, Schenectady, N.Y., assignor to
General Electric Company, a corporation of New York
Filed Jan. 12, 1960, Ser. No. 1,920
6 Claims. (Cl. 29—477)

This invention relates to the continuous manufacturing and/or joining of various articles and, more particularly, to the continuous joining of strip metal, for example, in tubing configuration, by a dip forming process.

There are several methods by which metal hollow articles and tubes may be formed or constructed. The most simple form of tube manufacture is the casting of the metal into a suitable tubular configuration. One of the more common methods employed in the manufacture of, for example, seamless copper pipe and tubing commences as a heavy walled casting, pierced billet, or cylindrical extrusion, which is rolled or drawn on a mandrel until it has the proper wall thickness. Both the diameter and wall thickness may be reduced. In modern mills, two long barrel shaped driving rolls are utilized together with a piercing mandrel therebetween. The piercing point is mounted on a long mandrel or arbor and positioned for rotation. This method is very time consuming, the drawing is very slow, and there is a definite limit on the length of tubes that can be produced.

The various uses and applicabilities of seamless tubing have been greatly extended in modern technology and the demand, therefore, is increasing. A good example of a use for small diameter copper tubing relates to electrical power generating equipment which employes fluid cooling for the conductors. In this equipment, it is desirable to have tubing of great length to be formed into coils and have a coolant fluid circulated therethrough. It is obvious, therefore, that a quick, efficient, and economical method of forming tubing and other joined articles of indefinite length would be greatly desired.

Accordingly, it is an object of this invention to provide an improved method of continuously joining and forming an article by dip forming.

It is another object of this invention to provide an improved method of continuously manufacturing tubing utilizing a dip forming process.

It is a further object of this invention to provide a method of continuously manufacturing tubing where the tubing may be partially preformed from strip stock.

It is still another object of this invention to provide a novel method of joining strip metal into continuous tubing.

It is still another object of this invention to provide a method of joining strip metal into continuous tubing while, at the same time, increasing the wall thickness of the tubing.

Briefly described, this invention in one form contemplates the forming of one or more strips of metal into, for example, a tubular form with adjacent edges and to thereafter pass the unjoined or open seamed tubing through a molten bath of similar metal to attain joining of the adjacent edges and simultaneous increase in the wall thickness.

This invention will be better understood when taken in connection with the following description and the drawing in which;

FIG. 1 is an illustration of a dip forming process employed to continuously join strip metal into a tubular configuration, FIG. 2 is a cross sectional view of an open seam hollow article or tube, FIG. 3 is a modification of FIG. 1 illustrating a lap joint, FIG. 4 is a further modification of FIG. 1 illustrating internal ribs in a hollow article, FIG. 5 is another modification of an open seam tube, FIG. 6 is another illustration of a dip forming process employed to continuously join strip metal into a tubular configuration, FIG. 7 is another modification of an open seam tube, and FIG. 8 is a sectional view of an open seam article in the form of an I beam.

Continuous metal casting or dip forming are processes well known in the art. By these methods, various hollow or solid configurations, such as for example, tubes and bars, may be fromed or increased in dimension. For example, in dip forming, a steel bar may be drawn through a molten steel bath to provide an increase in the thickness of the bar. By the same token, a rod may be drawn through a given metal bath in order to have deposited on the rod a coating of the metal, and after removal of the rod, a tube configuration is obtained.

The principle on which the dip forming process operates may be illustrated by the following example. If a piece of relatively cold metal is immersed in a bath of the same metal in the molten condition, heat will immediately flow from the adjacent part of the melt into the cold piece and a portion of the liquid metal will solidify and form a coating around the piece. At this stage, the piece must be withdrawn, or, as more heat flows into it from the liquid, the coating would remelt and eventually the piece itself melt. The temperature of the material and the melt are so adjusted that the material is surrounded by a substantial deposit or coating of the solidified melt. The temperature of this bath must be maintained sufficiently above the temperature at which its contents is molten to prevent any danger of crust formation but there is no apparent real advantage in maintaing it at a higher temperature. A maximum time for the material to be immersed in the melt is that in which the deposited coating would be completely melted away again. Maximum thickness of deposition occurs with a shorter immersion time. The time is dependent upon the metal concerned, the minimum cross sectional dimension of the piece and the amount of temperature difference between the melt and the core. A steel strip ⅛ inch thick fed into a bath of molten steel at 1600° C. with an immersion time of approximately ½ second provides a resultant strip of ¼ inch in overall thickness. The strip moves through the melt at a rate of about 600 feet per minute and travels approximately 5 feet in the bath.

This invention, however, relates, in one form, to a method of joining and increasing the size of open articles, for example, a seamles tube, where the core is of strip metal previously formed to a tubular or hollow configuration, although not joined, and thus depends upon the dip forming process to provide not only the joint, but also an increase in the wall thickness of the tube. The word "tube" is employed in its descriptive sense to be generic to hollow articles of various cross sections of extended length. The preformed tube must have a relatively clean surface and be at a low temperature while passing through a bath of molten metal of substantially the same composition as the preformed tube, the rate of the passing through the bath being such that there is a substantial deposition of the melt upon the preformed tube due to solidification of the bath metal adjacent the tube. A schematic arrangement of one example of the described system is illustrated in FIG. 1.

Referring to FIG. 1, a bath 2, containing a molten metal 3, is provided with a bottom opening or seal 4. Through seal 4 there extends a mandrel 5 suitably supported at 6 and with its working surface adjacent a die 7. A strip of metal 8 is being continually formed into a tubular configuration at 9 and passes through seal 4 into the molten metal 3. The tube emerges from the molten metal with the walls of increased thickness and is then reworked to both a smaller diameter and decreased wall thickness by the die mandrel combination. During the dip forming process, the crystal structure of the metal is altered. New crystal grains grow within the metal and will be found freely disposed across the original junction of the piece and a newly deposited metal. This effects a homogeneous bond at the junction.

A preferred embodiment of this invention would include cleaning and degassing apparatus and the molten bath itself may also be kept under an inert atmosphere. It is furthermore contemplated that a complete production apparatus may include the feeding of a sheet metal such as copper into a forming mill to be formed in tube form either before or after it is cleaned and degassed. Reference is made to copending application Serial No. 530,283, filed August 24, 1955, now U.S. Letters Patent 3,008,201 and assigned to the same assignee as the present invention for the preferred method of degassing which includes subjecting the article to vacuum conditions. The tube form is then fed through the molten bath, and after being taken from the molten bath, may be further subjected to other metal working operations, such as for example, increasing or decreasing the internal diameter, flattening, or forming various cross sections. In this respect, a particular application arises in providing relatively small diameter, copper tubing of extended lengths which may be utilized as wound coils in electrical power generating equipment and which by means of their hollowness are able to be internally fluid cooled. The copper tube may be formed from sheet metal to various configurations, for example, arcuate, angular, and combinations thereof. By way of example relative to copper, a length of .307 inch diameter copper rod may be passed through a molten bath at a temperature of about 1100° C. and the temperature of the copper rod entering the bath about 25° C. At a rate of passage of about 40 feet per minute, the article emerges from the bath with a substantially circular configuration at a temperature of about 1000° C. The average diameter of the emerging rod is .5029 inch.

Referring to FIG. 2, sheet metal is formed into a hollow or tube configuration 10 having adjacent ends 11 and 12, indicating an open seam. This configuration is continuously passed through a molten metal bath to have deposited thereon a coating which not only increases the wall thickness of the tube but also effectively joins the open seam. Additional passes may be made through the molten bath to provide additional wall thicknesses. Accretion or freezing of the molten metal effectively seals the seam and forms a good bond not only along the seam, but also over the entire coating surface. The tube edges 11 and 12 need not be in contiguous relationship as a small gap, in conjunction with the rate of speed of the article through the bath and the rate of freezing will prevent molten metal from flowing into the interior of the article.

Innumerable modifications will occur to those skilled in the art. Some examples are indicated in FIGS. 3–5. In FIG. 3, the tube 13 is formed with a lap joint by overlapping portions 14 and 15 and the configuration is passed through a molten metal bath in the same manner as the configuration of FIG. 2. The depositing coating of metal increases the wall thickness of the tube and effectively joins the lap joint.

The practice of this invention is readily applicable to the hithertofore difficult problem of providing internal ribs to a tube while still maintaining a relatively smooth and circular circumference. Referring now to FIG. 4, the sheet metal 16 is formed with one or more internally bent sections to provide cooling ribs 17. These ribs 17, in one form, are thin so that adjacent surfaces lie close to each other. The seam 18 for this tube may be defined by a butt joint of edges 19 and 20 or a lap joint of the same edges as in FIG. 3. Also, the position of the seam or joint may be as illustrated in FIG. 2 or may be anywhere along one of the ribs. When passing this configuration through a molten bath, the melt solidifies within the rib indentures, along the seam, and also increases the wall thickness of the tube.

It may be desirable, under some instances, not to pass the tube through the melt in the submerged condition, for example, where no increase in wall thickness is desired. While any of the previously described configurations are applicable to this process, FIG. 5 illustrates a further modification. In FIG. 5, the tube 21 includes edges 22 and 23 lying in a slight depression to form a butt joint or a lap joint. This tube is preferably passed through or under a melt where the freezing occurs in the depression only. This method may be practiced where the tube is coated so that no freezing occurs on the tube surface except in the depression or where the depression only is in contact with the melt at the surface of the melt or at the bottom of the melt.

The teachings of this invention also include the effective joining of various sections into closed configurations. For example, a pair of U channel sections may be joined to form a box section. A pair of V sections or C sections may be joined to form a closed configuration or simply a flat strip may be joined to a further section to provide a closed configuration. It is also understood that a plurality of strips of metal may be fed into a molten bath to immerge as architectural members, for example, I beams, wide flange beams, angles, etc.

In FIGURE 6, a modified dip forming process is shown in which a strip of metal 8 is withdrawn from a storage reel 24 and directed through a conventional surface cleaning apparatus 25, for example, and electrolytic cleaning bath, and a rinsing or washing bath 26. The cleaned and still wet strip 8 is guided by a pulley 27 through a drying chamber 28 which may be supplied with a neutral atmosphere from a source 29 by means of a conduit 30. Metal strip 8 is continuously formed into a tubular configuration or preformed tube at 9 beyond the outlet end of drying chamber 28. Tube 9 has an open seam with abutting edges or with a small gap between its edges. The strip of metal 8 in this tubular configuration 9 is fed into a vacuum chamber 31 provided with a vacuum source 32. As preformed tube 9 passes through vacuum chamber 31, which is disclosed in detail in above-identified U.S. Letters Patent 3,008,201, contaminants such as gases and water vapor are removed from the surfaces of the tube.

Tube 9 passes through a seal 4 surrounding the bottom opening of a bath 2 containing a molten metal 3. The molten metal is of the same composition or of substantially the same composition as tube 9. A cover 33 covers bath 2 and is provided with a central aperture 34 therein. A conduit 35 is positioned on cover 33 and has its opening in axial alignment with aperture 34 in cover 33. A protective or reducing atmosphere such as nitrogen is provided from a source 36 to conduit 35 whereby tube 9 is cooled therein after being withdrawn from bath 3.

FIG. 7 discloses a pair of C sections 37 joined together to form a closed configuration. Seams 38, which are provided between adjacent C sections 37, are in the form of small gaps. These sections are fed into molten bath 3 in accordance with the process disclosed in FIGURE 1 or FIGURE 6.

FIG. 8 discloses three adjacently positioned metal strips 39 arranged in a closed configuration with adjacent edges of the strips forming opened seams 40. Seams 40, which are provided between adjacent metal strips 39, are in the form of small gaps. These strips are fed into molten bath 3 in accordance with the process disclosed in FIG. 1 or FIG. 6.

It is thus understood that the objects of my invention are attained by the feeding of, for example, a hollow article having an open seam through a molten bath of a metal similar to that of the article to thereby effect not only a joining of the seam but also an increase in wall thickness. As an example of one application of this method, copper tubing of indeterminate length may be provided to thereafter be formed into conducting coils for electrical power generating equipment wherein the coils are fluid cooled. The article is precleaned and vacuum degassed before entry into the bath. Cooling of the hollow article after emerging from the bath may take place in an inert atmosphere to prevent oxidation. Several methods or means are available for passing the tube through a molten bath. For example, the tube may pass through the bottom or sides of a molten metal bath where suitable seals are employed to prevent leakage of the molten metal from the bath. FIG. 1 illustrates the preferred configuration to be employed with a circular seal. The embodiment of FIG. 1 as well as the embodiments of the remaining figures may be closed at one end by seals, plugs, crimping, etc., at the start of the process to prevent molten metal from entering the tube. The tube may also be first positioned in the bath and the bath thereafter filled as the tube moves. Various modifications will be apparent to those skilled in the art.

While a specific method and apparatus in accordance with this invention has been shown and described, it is not desired that the invention be limited to the particular configuration as illustrated, and it is intended by the appended claims to cover all modifications within the spirit and scope of this invention.

What I claim as new and desire to secure by Letters Patent of the United States is:

1. A method of producing an elongated hollow metal article which comprises in combination, providing a pair of adjacently positioned metal sections arranged in a closed hollow configuration with adjacent edges of the sections forming opened seams, providing a molten metal bath of the same metal as the said sections, passing the said sections in contact with the said molten metal bath to provide a deposited coating of the metal across the said seams, the metal freezing on the said seams by accretion, and withdrawing the hollow article from the said molten bath as a seamless hollow article.

2. A method of producing an elongated hollow metal article comprising in combination, providing a pair of adjacently positioned metal sections arranged in a closed hollow configuration with adjacent edges of the sections forming opened seams, providing a molten metal bath of the same metal as the said pairs of sections, feeding the said sections through the said molten bath to provide a deposited coating of metal about the hollow article while at the same time joining said seams, and withdrawing a seamless hollow article from said bath.

3. A method of producing an elongated metal article which comprises in combination, providing a pair of adjacently positioned metal strips arranged in a closed configuration with adjacent edges of the strips forming opened seams, providing a molten metal bath of the same metal as said strips, passing said strips at the same rate of travel through said molten metal bath to provide a deposited coating of the metal across said seams, the metal freezing on said seams by accretion, and withdrawing the article from said molten bath.

4. A method of producing an elongated metal article which comprises in combination, providing a plurality of adjacently positioned metal strips arranged in a closed configuration with adjacent edges of the strips forming opened seams, providing a molten bath of the same metal as said strips, passing said strips at the same rate of travel through said molten metal bath to provide a deposited coating of metal across said seams, the metal freezing on said seams by accretion, and withdrawing the article from the molten bath.

5. A method of producing seamless metal tubing from strip metal containing copper which comprises precleaning said strip metal, forming said strip metal into a tubular configuration having an open seam, vacuum degassing said tube, providing a molten metal bath of the same metal as said tube, passing the tube through the molten metal bath to provide a joining of the seam and an increase in wall thickness of the tube by deposition of metal from the bath, and withdrawing seamless tubing from the said bath.

6. A method of producing seamless metal tubing from strip metal containing copper which comprises precleaning said strip metal, forming said strip metal into a tubular configuration having an open seam, vacuum degassing said tube, providing a molten metal bath of the same metal as said tube, passing the tube through the molten metal bath to provide a joining of the seam and an increase in wall thickness of the tube by deposition of metal from the bath, withdrawing seamless tubing from said bath, and cooling said seamless tubing in an inert atmosphere.

References Cited by the Examiner

UNITED STATES PATENTS

| 1,424,170 | 8/22 | Lee | 29—477.7 X |
| 1,424,181 | 8/22 | Pritchard | 29—477.7 X |
| 1,531,730 | 3/25 | Bundy | 113—33 X |
| 2,715,263 | 8/55 | MacGregor | 29—477.7 |
| 2,854,732 | 10/58 | Hessenberg | 29—528 |
| 3,008,201 | 11/61 | Carreker | 22—73 X |

FOREIGN PATENTS 229,045  12/58  Australia.

WHITMORE A. WILTZ, *Primary Examiner.*

HYLAND BIZOT, *Examiner.*